US012683479B2

(12) United States Patent (10) Patent No.: US 12,683,479 B2
Shen (45) Date of Patent: Jul. 14, 2026

(54) SWITCHING POWER SUPPLY CONTROL METHOD AND SWITCHING POWER SUPPLY

(71) Applicant: MIPTECH LIMITED, Central Hong Kong (CN)

(72) Inventor: Jun Shen, Central Hong Kong (CN)

(73) Assignee: MIPTECH LIMITED (CN)

(*) Notice: Subject to any disclaimer, the term of this patent is extended or adjusted under 35 U.S.C. 154(b) by 207 days.

(21) Appl. No.: 18/706,347

(22) PCT Filed: Nov. 3, 2022

(86) PCT No.: PCT/CN2022/129615
§ 371 (c)(1),
(2) Date: Apr. 30, 2024

(87) PCT Pub. No.: WO2023/078362
PCT Pub. Date: May 11, 2023

(65) Prior Publication Data
US 2024/0421688 A1 Dec. 19, 2024

(30) Foreign Application Priority Data

Nov. 4, 2021 (CN) .......................... 202111299476.6

(51) Int. Cl.
*H02M 1/00* (2006.01)
*H02M 1/44* (2007.01)
*H02M 3/335* (2006.01)
(52) U.S. Cl.
CPC ........... *H02M 1/0058* (2021.05); *H02M 1/44* (2013.01); *H02M 3/33576* (2013.01)
(58) Field of Classification Search
CPC .. H02M 1/0058; H02M 1/44; H02M 3/33576; H02M 3/33515; H02M 3/33523; H02M 1/36; H02J 7/06
See application file for complete search history.

(56) References Cited

U.S. PATENT DOCUMENTS

| | | | | |
|---|---|---|---|---|
| 10,205,377 B1 * | 2/2019 | Bianco | .................. | H02M 1/083 |
| 2008/0259656 A1 * | 10/2008 | Grant | ................ | H02M 3/33523 |
| | | | | 363/21.18 |

(Continued)

FOREIGN PATENT DOCUMENTS

| | | |
|---|---|---|
| CN | 106026712 A | 10/2016 |
| CN | 106411135 A | 2/2017 |

(Continued)

OTHER PUBLICATIONS

Office Action dated Aug. 1, 2024 from corresponding Chinese Application No. 202111299476.6.

(Continued)

*Primary Examiner* — Kyle J Moody
(74) *Attorney, Agent, or Firm* — Terrence J. Edwards; TechLaw Ventures, PLLC

(57) ABSTRACT

A switching power supply control method includes the following: after the high-voltage startup of the switching power supply, the secondary control module adjusts the cut-off current of the second switching transistor according to a voltage waveform at a second connection point until a voltage waveform at a first connection point just reaches zero, the primary control module controls the first switching transistor to be turned on; the primary control module adjusts the peak current of the first switching transistor until the peak current of the first switching transistor reaches a preset value, the primary control module controls the first switching transistor to be turned off; the secondary control module controls the second switching transistor to be turned on; and in case where the switching current of the second switching transistor is at a current zero-crossing point, the secondary control module controls the second switching transistor to be turned off.

20 Claims, 10 Drawing Sheets

(56) References Cited

U.S. PATENT DOCUMENTS

| | | |
|---|---|---|
| 2014/0043863 A1 | 2/2014 | Telefus et al. |
| 2021/0143725 A1 | 5/2021 | Deng et al. |

FOREIGN PATENT DOCUMENTS

| | | |
|---|---|---|
| CN | 108155799 A | 6/2018 |
| CN | 108539986 A | 9/2018 |
| CN | 108667302 A | 10/2018 |
| CN | 109039093 A | 12/2018 |
| CN | 111478589 A | 7/2020 |
| CN | 111509978 A | 8/2020 |
| CN | 111628654 A | 9/2020 |
| CN | 112054659 A | 12/2020 |
| CN | 113131746 A | 7/2021 |
| CN | 113131747 A | 7/2021 |
| CN | 113890378 A | 1/2022 |

OTHER PUBLICATIONS

Excerpt from Book: Guide to Principle and Application of Digital Instrument for Electric Power Measurement/Ren Zhicheng; Edited by Zhou Zhong—Beijing: China Electric Power Press, 2007; ISBN 978-7-5083-5078-3; Published by China Electric Power Press, 6 Sanlihe Road, Beijing 100044 http: //www.cepp.com; Apr. 2007 First edition.

Supplemental Search Report dated Apr. 9, 2025 from corresponding Chinese Application No. 2021-11299476.6.

Notice of Rejection dated Apr. 23, 2025 from corresponding Chinese Application No. 2021-11299476.6.

International Search Report dated Jan. 19, 2023 from corresponding International Application No. PCT/CN2022/129615.

* cited by examiner

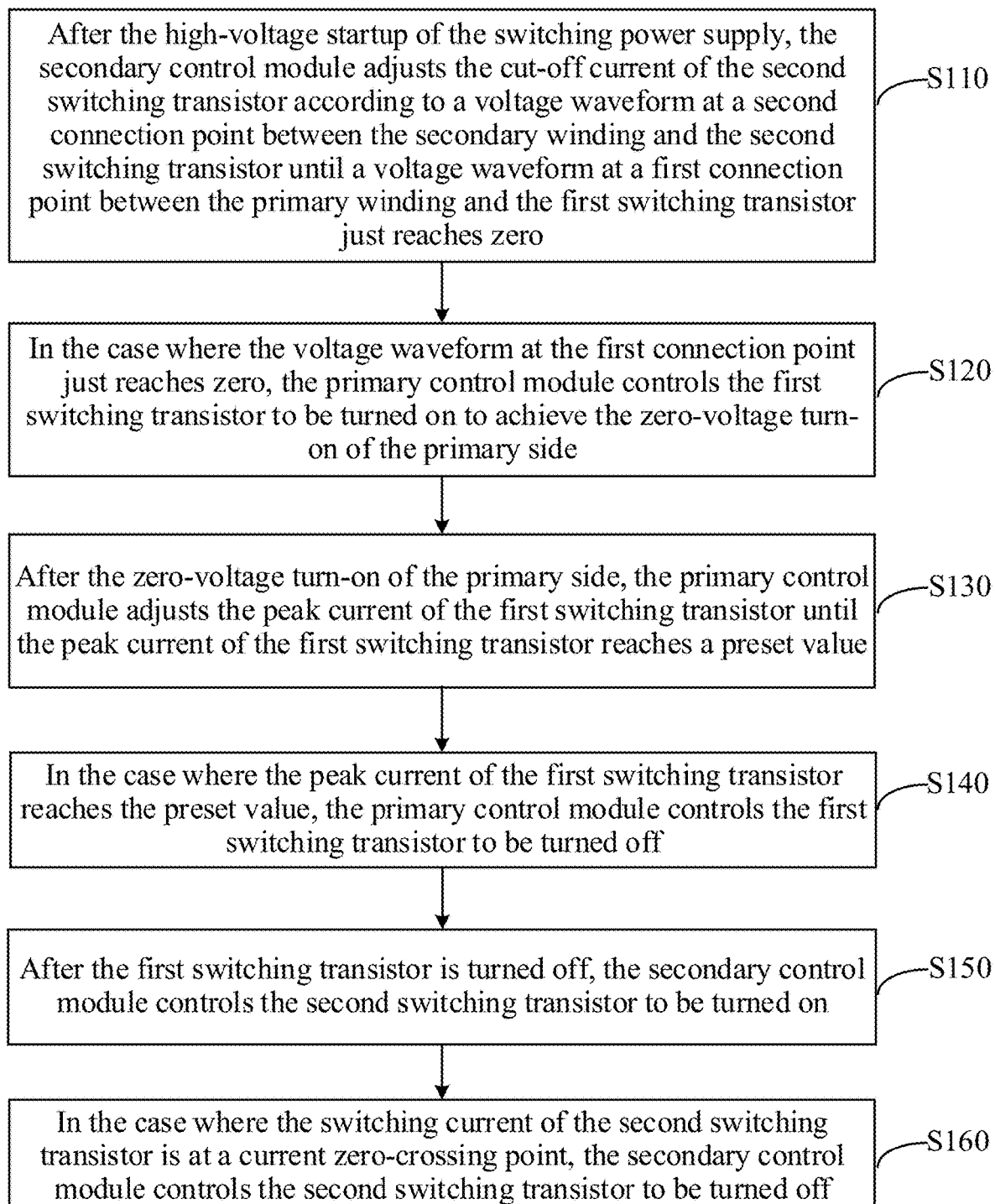

After the high-voltage startup of the switching power supply, the secondary control module adjusts the cut-off current of the second switching transistor according to a voltage waveform at a second connection point between the secondary winding and the second switching transistor until a voltage waveform at a first connection point between the primary winding and the first switching transistor just reaches zero ⟋S110

In the case where the voltage waveform at the first connection point just reaches zero, the primary control module controls the first switching transistor to be turned on to achieve the zero-voltage turn-on of the primary side ⟋S120

After the zero-voltage turn-on of the primary side, the primary control module adjusts the peak current of the first switching transistor until the peak current of the first switching transistor reaches a preset value ⟋S130

In the case where the peak current of the first switching transistor reaches the preset value, the primary control module controls the first switching transistor to be turned off ⟋S140

After the first switching transistor is turned off, the secondary control module controls the second switching transistor to be turned on ⟋S150

In the case where the switching current of the second switching transistor is at a current zero-crossing point, the secondary control module controls the second switching transistor to be turned off ⟋S160

FIG. 2

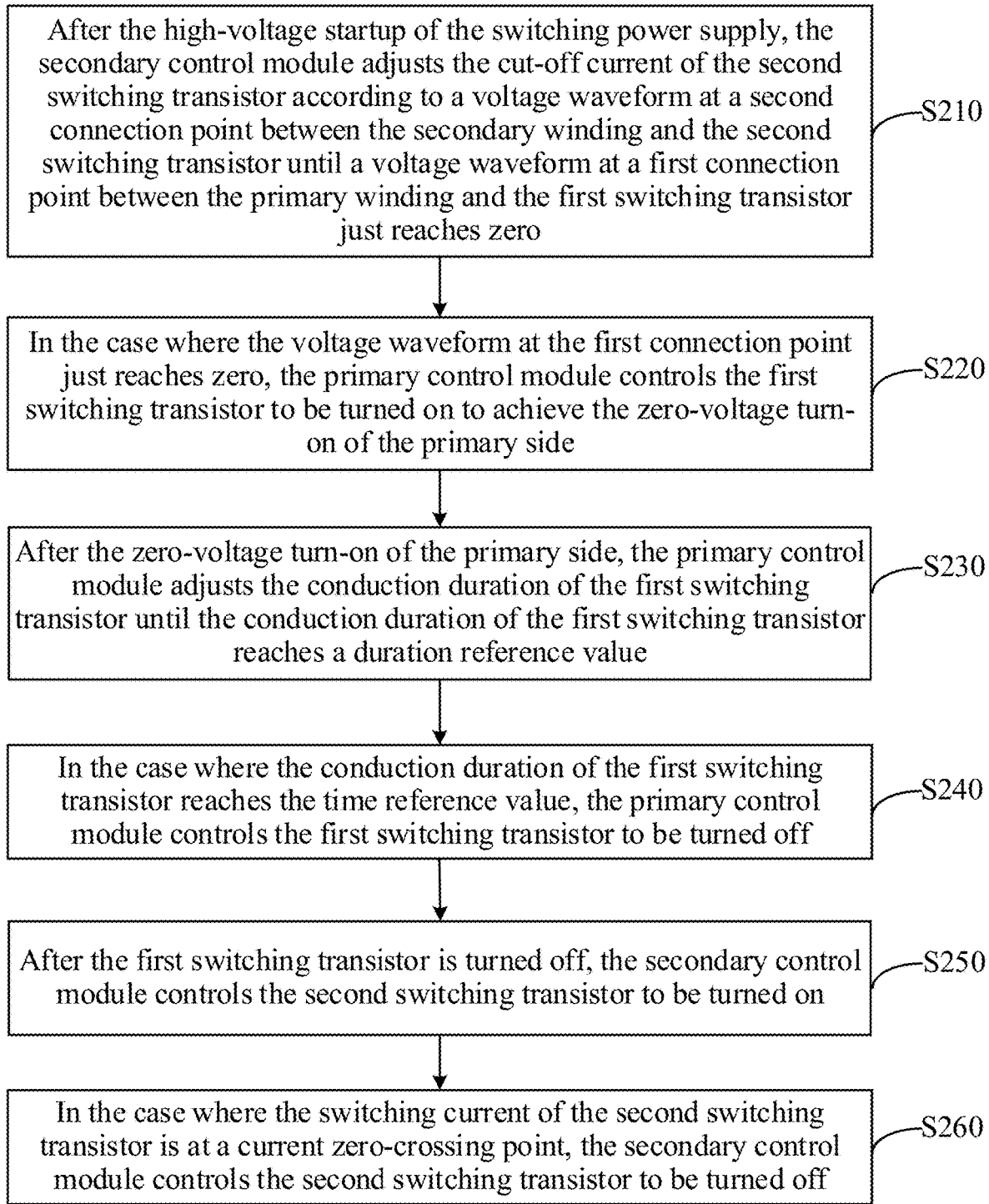

After the high-voltage startup of the switching power supply, the secondary control module adjusts the cut-off current of the second switching transistor according to a voltage waveform at a second connection point between the secondary winding and the second switching transistor until a voltage waveform at a first connection point between the primary winding and the first switching transistor just reaches zero —S210

In the case where the voltage waveform at the first connection point just reaches zero, the primary control module controls the first switching transistor to be turned on to achieve the zero-voltage turn-on of the primary side —S220

After the zero-voltage turn-on of the primary side, the primary control module adjusts the conduction duration of the first switching transistor until the conduction duration of the first switching transistor reaches a duration reference value —S230

In the case where the conduction duration of the first switching transistor reaches the time reference value, the primary control module controls the first switching transistor to be turned off —S240

After the first switching transistor is turned off, the secondary control module controls the second switching transistor to be turned on —S250

In the case where the switching current of the second switching transistor is at a current zero-crossing point, the secondary control module controls the second switching transistor to be turned off —S260

FIG. 3

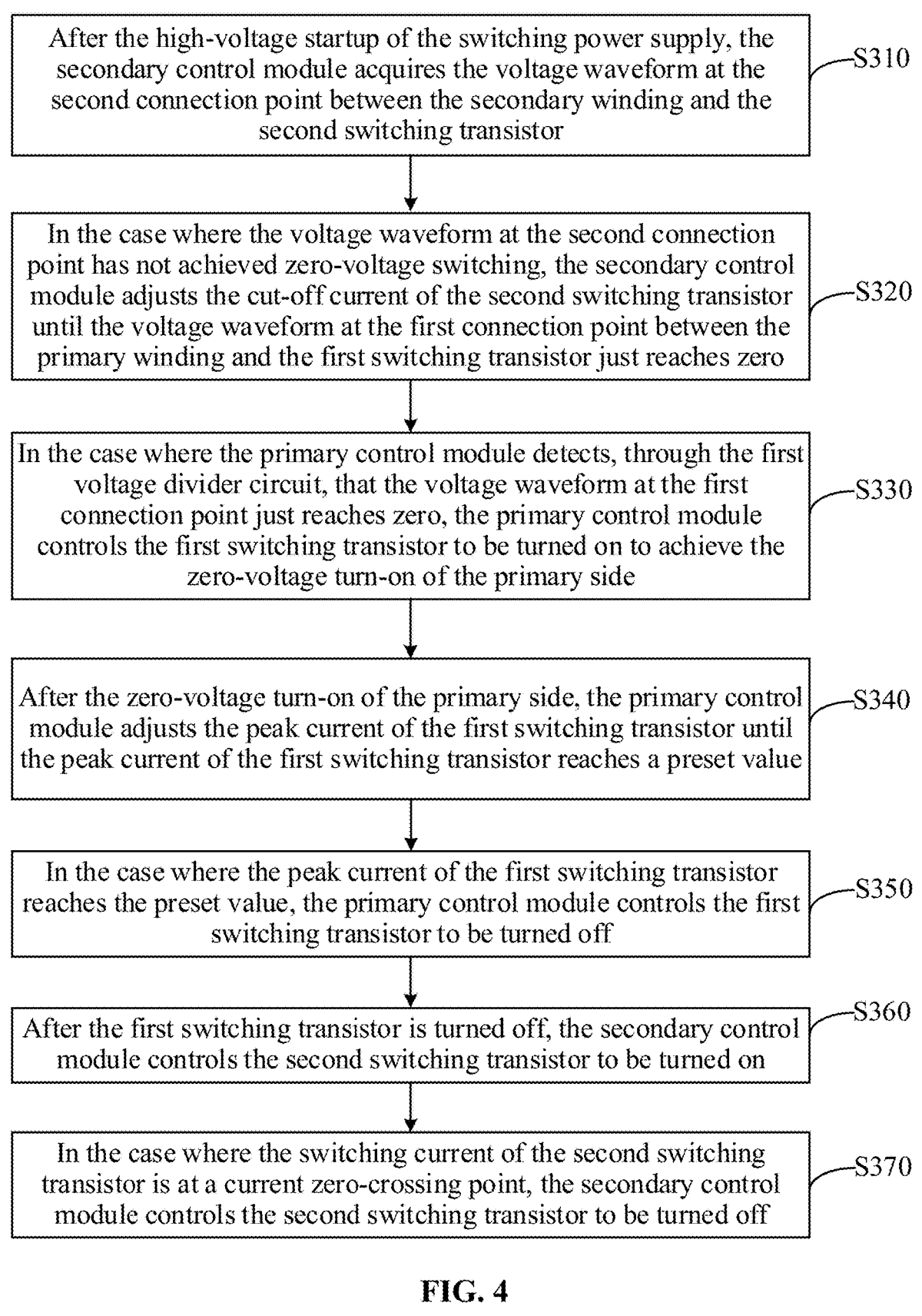

After the high-voltage startup of the switching power supply, the secondary control module acquires the voltage waveform at the second connection point between the secondary winding and the second switching transistor ─S310

In the case where the voltage waveform at the second connection point has not achieved zero-voltage switching, the secondary control module adjusts the cut-off current of the second switching transistor until the voltage waveform at the first connection point between the primary winding and the first switching transistor just reaches zero ─S320

In the case where the primary control module detects, through the first voltage divider circuit, that the voltage waveform at the first connection point just reaches zero, the primary control module controls the first switching transistor to be turned on to achieve the zero-voltage turn-on of the primary side ─S330

After the zero-voltage turn-on of the primary side, the primary control module adjusts the peak current of the first switching transistor until the peak current of the first switching transistor reaches a preset value ─S340

In the case where the peak current of the first switching transistor reaches the preset value, the primary control module controls the first switching transistor to be turned off ─S350

After the first switching transistor is turned off, the secondary control module controls the second switching transistor to be turned on ─S360

In the case where the switching current of the second switching transistor is at a current zero-crossing point, the secondary control module controls the second switching transistor to be turned off ─S370

FIG. 4

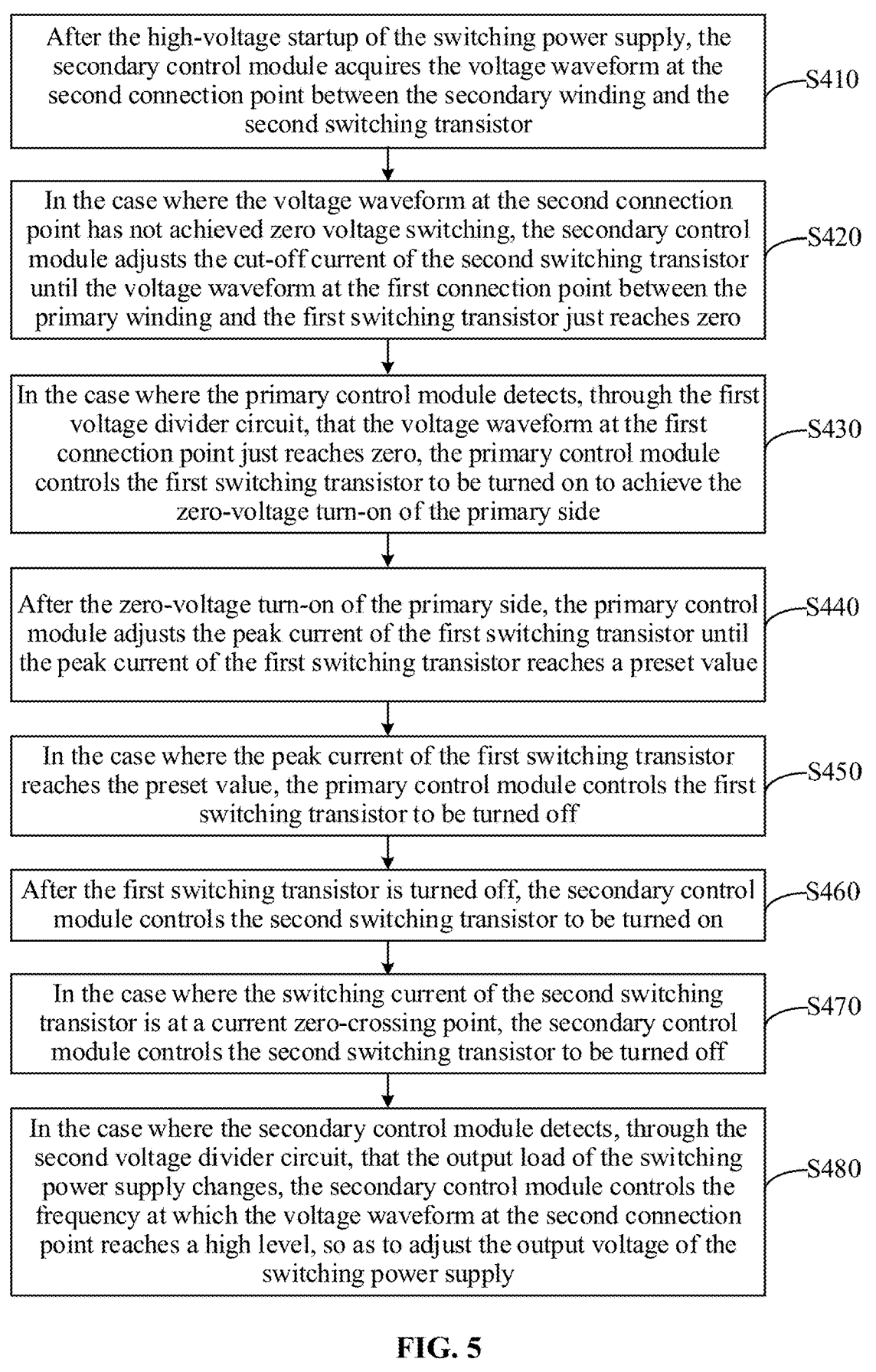

After the high-voltage startup of the switching power supply, the secondary control module acquires the voltage waveform at the second connection point between the secondary winding and the second switching transistor    ⌐S410

In the case where the voltage waveform at the second connection point has not achieved zero voltage switching, the secondary control module adjusts the cut-off current of the second switching transistor until the voltage waveform at the first connection point between the primary winding and the first switching transistor just reaches zero    ⌐S420

In the case where the primary control module detects, through the first voltage divider circuit, that the voltage waveform at the first connection point just reaches zero, the primary control module controls the first switching transistor to be turned on to achieve the zero-voltage turn-on of the primary side    ⌐S430

After the zero-voltage turn-on of the primary side, the primary control module adjusts the peak current of the first switching transistor until the peak current of the first switching transistor reaches a preset value    ⌐S440

In the case where the peak current of the first switching transistor reaches the preset value, the primary control module controls the first switching transistor to be turned off    ⌐S450

After the first switching transistor is turned off, the secondary control module controls the second switching transistor to be turned on    ⌐S460

In the case where the switching current of the second switching transistor is at a current zero-crossing point, the secondary control module controls the second switching transistor to be turned off    ⌐S470

In the case where the secondary control module detects, through the second voltage divider circuit, that the output load of the switching power supply changes, the secondary control module controls the frequency at which the voltage waveform at the second connection point reaches a high level, so as to adjust the output voltage of the switching power supply    ⌐S480

FIG. 5

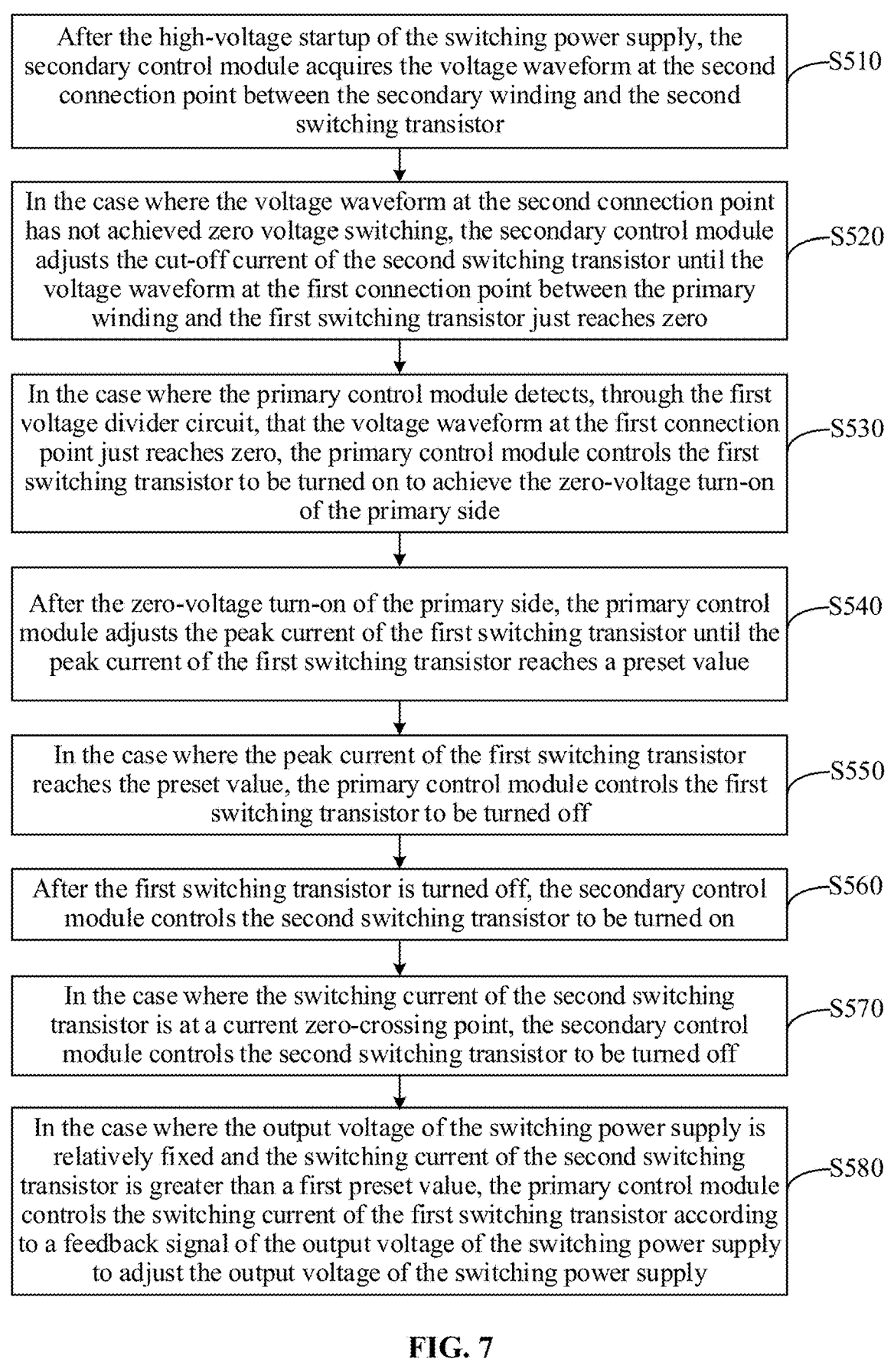

After the high-voltage startup of the switching power supply, the secondary control module acquires the voltage waveform at the second connection point between the secondary winding and the second switching transistor ⟋S510

↓

In the case where the voltage waveform at the second connection point has not achieved zero voltage switching, the secondary control module adjusts the cut-off current of the second switching transistor until the voltage waveform at the first connection point between the primary winding and the first switching transistor just reaches zero ⟋S520

↓

In the case where the primary control module detects, through the first voltage divider circuit, that the voltage waveform at the first connection point just reaches zero, the primary control module controls the first switching transistor to be turned on to achieve the zero-voltage turn-on of the primary side ⟋S530

↓

After the zero-voltage turn-on of the primary side, the primary control module adjusts the peak current of the first switching transistor until the peak current of the first switching transistor reaches a preset value ⟋S540

↓

In the case where the peak current of the first switching transistor reaches the preset value, the primary control module controls the first switching transistor to be turned off ⟋S550

↓

After the first switching transistor is turned off, the secondary control module controls the second switching transistor to be turned on ⟋S560

↓

In the case where the switching current of the second switching transistor is at a current zero-crossing point, the secondary control module controls the second switching transistor to be turned off ⟋S570

↓

In the case where the output voltage of the switching power supply is relatively fixed and the switching current of the second switching transistor is greater than a first preset value, the primary control module controls the switching current of the first switching transistor according to a feedback signal of the output voltage of the switching power supply to adjust the output voltage of the switching power supply ⟋S580

FIG. 7

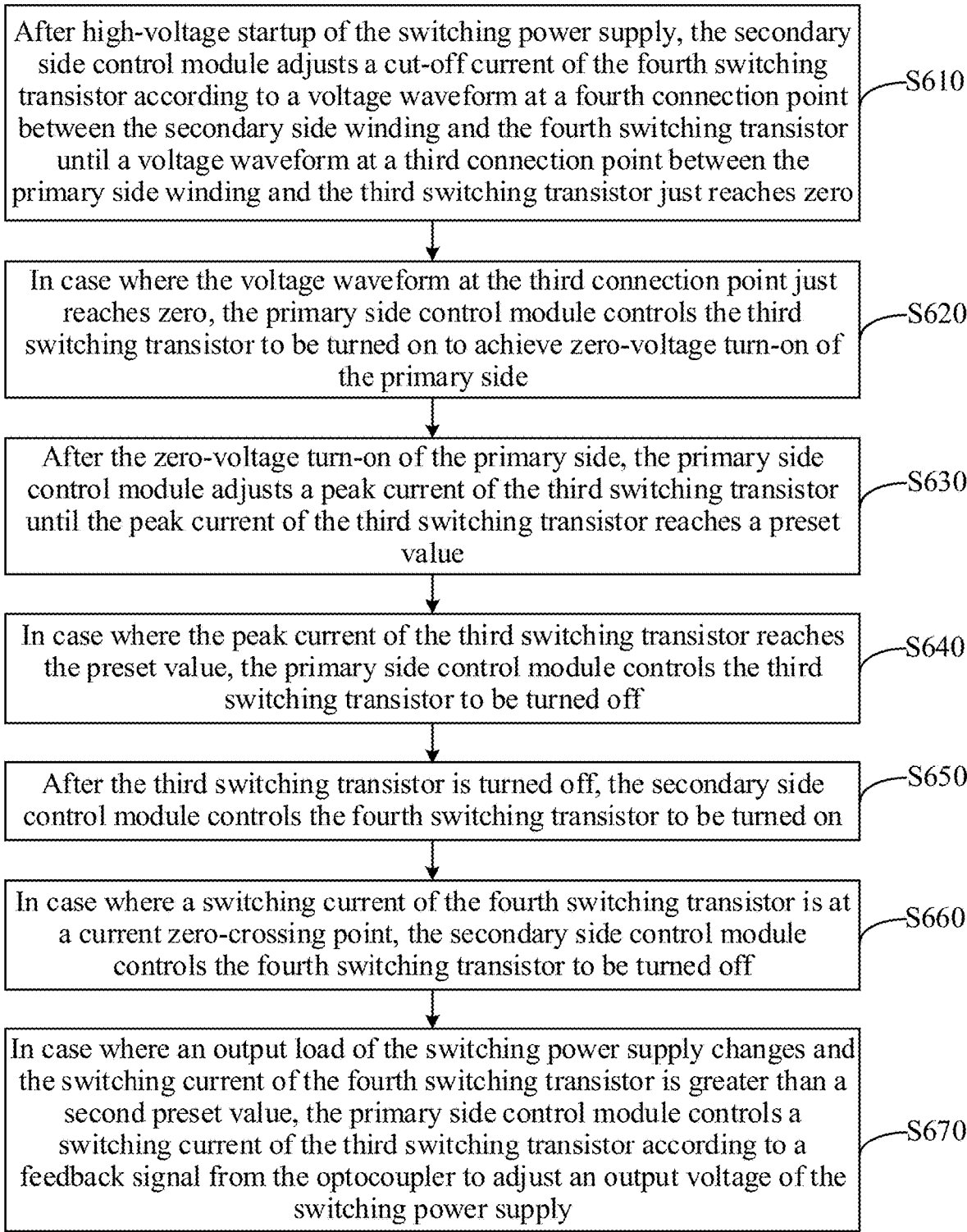

After high-voltage startup of the switching power supply, the secondary side control module adjusts a cut-off current of the fourth switching transistor according to a voltage waveform at a fourth connection point between the secondary side winding and the fourth switching transistor until a voltage waveform at a third connection point between the primary side winding and the third switching transistor just reaches zero ⟶S610

In case where the voltage waveform at the third connection point just reaches zero, the primary side control module controls the third switching transistor to be turned on to achieve zero-voltage turn-on of the primary side ⟶S620

After the zero-voltage turn-on of the primary side, the primary side control module adjusts a peak current of the third switching transistor until the peak current of the third switching transistor reaches a preset value ⟶S630

In case where the peak current of the third switching transistor reaches the preset value, the primary side control module controls the third switching transistor to be turned off ⟶S640

After the third switching transistor is turned off, the secondary side control module controls the fourth switching transistor to be turned on ⟶S650

In case where a switching current of the fourth switching transistor is at a current zero-crossing point, the secondary side control module controls the fourth switching transistor to be turned off ⟶S660

In case where an output load of the switching power supply changes and the switching current of the fourth switching transistor is greater than a second preset value, the primary side control module controls a switching current of the third switching transistor according to a feedback signal from the optocoupler to adjust an output voltage of the switching power supply ⟶S670

FIG. 10

SWITCHING POWER SUPPLY CONTROL METHOD AND SWITCHING POWER SUPPLY

CROSS REFERENCE TO RELATED APPLICATIONS

This application is a National Stage application filed under 35 U.S.C. § 371 based on International Patent Application No. PCT/CN2022/129615, filed on Nov. 3, 2022, which claims priority to Chinese Patent Application 202111299476.6, filed with the China National Intellectual Property Administration (CNIPA) on Nov. 4, 2021, the disclosures of each of which are incorporated herein by reference in their respective entireties as if fully set forth herein.

TECHNICAL FIELD

Embodiments of the present application relate to the field of power supply technologies, for example, a switching power supply control method and a switching power supply.

BACKGROUND

In the field of power supplies, an isolated switching power supply plays an important role. As the most common type of isolated switching power supply, a flyback alternating current-direct current (AC-DC) isolated switching power supply is widely used in the power supply of electrical devices such as mobile phones, tablet computers, and household appliances.

In the related technologies, a typical flyback AC-DC isolated switching power supply has a large primary switching loss, low efficiency, and severe electromagnetic interference (EMI), limiting the increase in switching frequency and hindering the miniaturization of the switching power supply. Based on this, the active clamp flyback design that can achieve zero voltage switching (ZVS) has emerged. However, compared with the typical flyback AC-DC isolated switching power supply, the active clamp flyback AC-DC isolated switching power supply requires multiple additional control loops and corresponding circuit structures. Therefore, the structure of the switching power supply tends to be complex with higher hardware costs and a higher level of power control complexity.

In addition, the primary side and secondary side control of the flyback AC-DC isolated switching power supply in the related technologies generally requires an optocoupler or other types of coupling adapters. The use of the preceding devices not only increases the complexity of the switching power supply structure but also reduces the reliability of the switching power supply. Although the commonly used primary side regulation feedback control method in the related technologies eliminates components such as optocouplers, the control loop response speed of this control method is relatively slow, and the control method is difficult to apply to chargers with fast charging protocols such as USB-C (that is, USB Type-C, a USB interface standard).

SUMMARY

Embodiments of the present application provide a switching power supply control method and a switching power supply.

In a first aspect, an embodiment of the present application provides a switching power supply control method. A switching power supply includes a primary winding, a secondary winding, a primary control module, a secondary control module, a first switching transistor connected to the primary winding, and a second switching transistor connected to the secondary winding.

The switching power supply control method includes the steps described below.

After the high-voltage startup of the switching power supply, the secondary control module adjusts the cut-off current of the second switching transistor according to a voltage waveform at a second connection point between the secondary winding and the second switching transistor until a voltage waveform at a first connection point between the primary winding and the first switching transistor just reaches zero.

In the case where the voltage waveform at the first connection point just reaches zero, the primary control module controls the first switching transistor to be turned on to achieve the zero-voltage turn-on of a primary side.

After the zero-voltage turn-on of the primary side, the primary control module adjusts the peak current of the first switching transistor until the peak current of the first switching transistor reaches a preset value.

In the case where the peak current of the first switching transistor reaches the preset value, the primary control module controls the first switching transistor to be turned off.

After the first switching transistor is turned off, the secondary control module controls the second switching transistor to be turned on.

In the case where the switching current of the second switching transistor is at a current zero-crossing point, the secondary control module controls the second switching transistor to be turned off.

In a second aspect, an embodiment of the present application further provides a switching power supply. The switching power supply includes a primary winding, a secondary winding, a primary control module, a secondary control module, a first switching transistor connected to the primary winding, and a second switching transistor connected to the secondary winding.

The primary winding is configured to store energy in the case where the first switching transistor is turned on.

The secondary winding is configured to generate the output voltage in the case where the second switching transistor is turned on.

The first switching transistor is configured to be turned on or off according to a drive signal generated by the primary control module.

The second switching transistor is configured to be turned on or off according to a drive signal generated by the secondary control module.

The primary control module is configured to control the first switching transistor to be turned on in the case where a voltage waveform at a first connection point just reaches zero; adjust the peak current of the first switching transistor after the zero-voltage turn-on of a primary side; and in the case where the peak current of the first switching transistor reaches a preset value, control the first switching transistor to be turned off.

The secondary control module is configured to, after the high-voltage startup of the switching power supply, adjust the cut-off current of the second switching transistor according to a voltage waveform at a second connection point between the secondary winding and the second switching transistor; after the first switching transistor is turned off, control the second switching transistor to be turned on; and in the case where the switching current of the second switching transistor is at a current zero-crossing point, control the second switching transistor to be turned off.

In a third aspect, an embodiment of the present application further provides a switching power supply control method. A switching power supply includes a primary side winding, a secondary side winding, a primary side control module, a secondary side control module, a third switching transistor connected to the primary side winding, a fourth switching transistor connected to the secondary side winding, and an optocoupler.

The switching power supply control method includes the steps described below.

After the high-voltage startup of the switching power supply, the secondary side control module adjusts the cut-off current of the fourth switching transistor according to a voltage waveform at a fourth connection point between the secondary side winding and the fourth switching transistor until a voltage waveform at a third connection point between the primary side winding and the third switching transistor just reaches zero.

In the case where the voltage waveform at the third connection point just reaches zero, the primary side control module controls the third switching transistor to be turned on to achieve the zero-voltage turn-on of a primary side.

After the zero-voltage turn-on of the primary side, the primary side control module adjusts the peak current of the third switching transistor until the peak current of the third switching transistor reaches a preset value.

In the case where the peak current of the third switching transistor reaches the preset value, the primary side control module controls the third switching transistor to be turned off.

After the third switching transistor is turned off, the secondary side control module controls the fourth switching transistor to be turned on.

In the case where the switching current of the fourth switching transistor is at a current zero-crossing point, the secondary side control module controls the fourth switching transistor to be turned off.

In the case where the output load of the switching power supply changes and the switching current of the fourth switching transistor is greater than a second preset value, the primary side control module controls the switching current of the third switching transistor according to a feedback signal from the optocoupler to adjust the output voltage of the switching power supply.

BRIEF DESCRIPTION OF DRAWINGS

FIG. 2 is a flowchart of a switching power supply control method according to an embodiment of the present application;

FIG. 3 is a flowchart of another switching power supply control method according to an embodiment of the present application;

FIG. 4 is a flowchart of another switching power supply control method according to an embodiment of the present application;

FIG. 5 is a flowchart of another switching power supply control method according to an embodiment of the present application;

FIG. 7 is a flowchart of another switching power supply control method according to an embodiment of the present application;

FIG. 10 is a flowchart of another switching power supply control method according to an embodiment of the present application.

DETAILED DESCRIPTION

Figure 1:
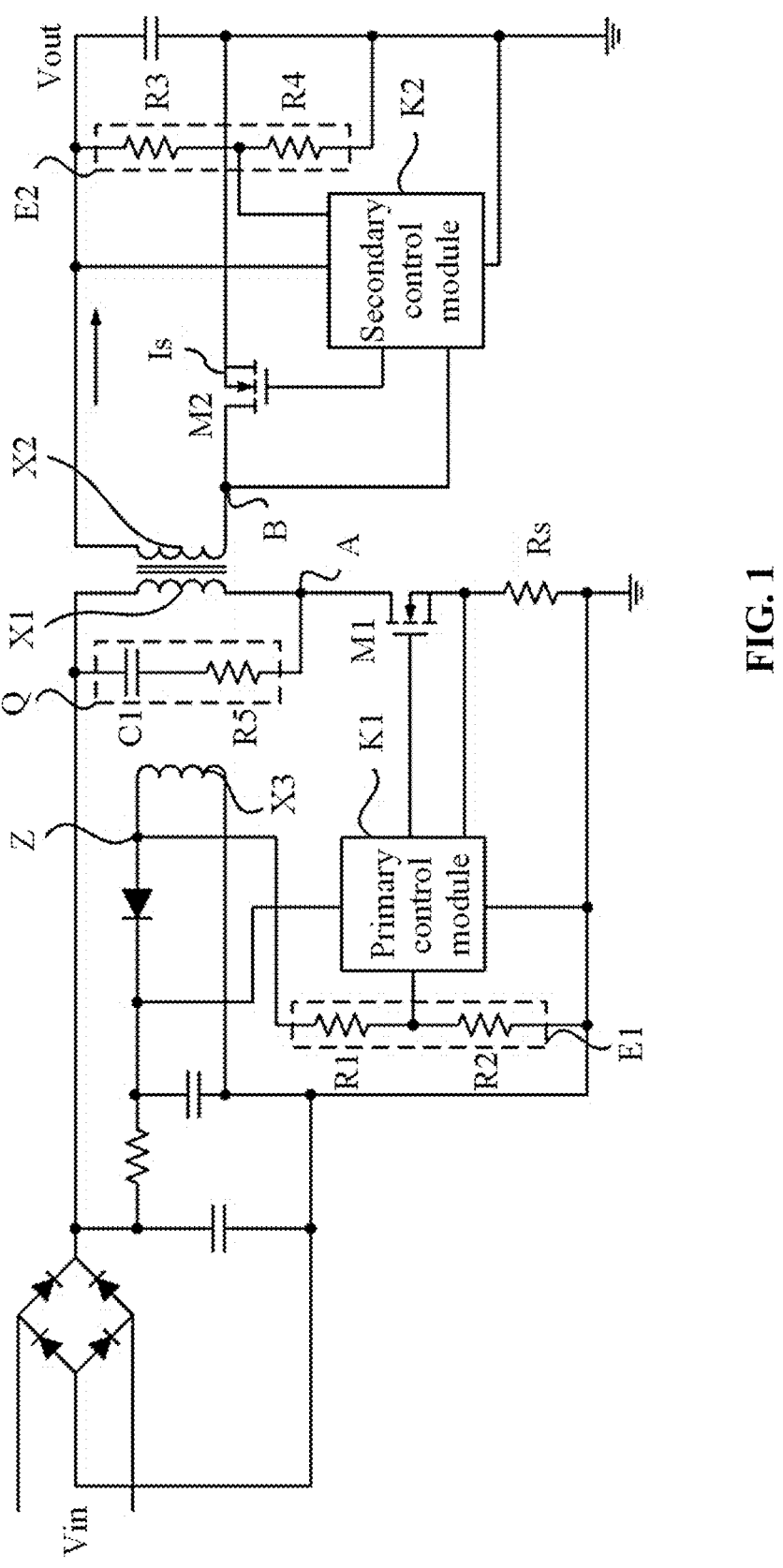
FIG. 1 is a structural diagram of a switching power supply according to an embodiment of the present application.

The present application is described below in conjunction with drawings and embodiments. It is to be understood that the embodiments described herein are intended to illustrate the present application. Additionally, it is to be noted that for ease of description, only part, not all, of structures related to the present application are illustrated in the drawings.

FIG. 1 is a structural diagram of a switching power supply according to an embodiment of the present application, and FIG. 2 is a flowchart of a switching power supply control method according to an embodiment of the present application. This embodiment applies to the power supply of any device with a typical flyback AC-DC isolated switching power supply structure. The switching power supply control method can be performed by the switching power supply in the embodiment of the present application as the execution subject. The execution subject may be implemented in software and/or hardware. The switching power supply includes a primary winding X1, a secondary winding X2, a primary control module K1, a secondary control module K2, a first switching transistor M1 connected to the primary winding X1, and a second switching transistor M2 connected to the secondary winding X2. Vin denotes the input voltage of the switching power supply, and Vout denotes the output voltage of the switching power supply. As shown in FIG. 2, the switching power supply control method includes the steps described below.

In S110, after the high-voltage startup of the switching power supply, the secondary control module adjusts the cut-off current of the second switching transistor according to a voltage waveform at a second connection point between the secondary winding and the second switching transistor until a voltage waveform at a first connection point between the primary winding and the first switching transistor just reaches zero.

In an embodiment, a high-voltage startup method for the switching power supply can be achieved by acquiring electrical power from the bus voltage through a high-voltage startup circuit in the related technologies and then starting up the switching power supply. It can be seen that the cut-off current of the second switching transistor M2 refers to the current at which the second switching transistor M2 is turned off. The process in which the secondary control module K2 adjusts the cut-off current of the second switching transistor M2 may be to increase, may be to decrease, may be to first increase and then decrease, may be to first decrease and then increase, or may be a form of adjustment process with repeated oscillations. It is to be understood that the preceding adjustment process of the cut-off current of the second switching transistor M2 may be changed adaptively according to the settings and parameter selection of the switching power supply.

In S120, in the case where the voltage waveform at the first connection point just reaches zero, the primary control module controls the first switching transistor to be turned on to achieve the zero-voltage turn-on of the primary side.

The voltage waveform at a first connection point A just reaching zero means that a valley value of the voltage waveform at the first connection point A just reaches a zero voltage state. In this case, the primary control module K1 controls the first switching transistor M1 to be turned on, and the voltage difference between the source and drain of the first switching transistor M1 is zero.

It can be seen that the voltage waveform at the first connection point A just reaching zero indicates that the switching power supply can achieve zero voltage switching (ZVS) at this moment. Based on this, in the embodiment of the present application, at the moment when the voltage waveform at the first connection point A just reaches zero, the primary control module K1 is configured to control the first switching transistor M1 to be turned on, thereby achieving the zero-voltage turn-on of the first switching transistor M1.

It is to be understood that since the switching power supply provided in this embodiment has the typical flyback AC-DC isolated switching power supply structure, the first switching transistor M1 and the second switching transistor M2 cannot be turned on simultaneously. Therefore, in the case where the primary control module K1 controls the first switching transistor M1 to be turned on, the second switching transistor M2 is in an off state.

In S130, after the zero-voltage turn-on of the primary side, the primary control module adjusts the peak current of the first switching transistor until the peak current of the first switching transistor reaches a preset value.

In an embodiment, the process in which the primary control module K1 adjusts the peak current of the first switching transistor M1 may be to maintain the peak current of the first switching transistor M1 at a fixed value, may be to increase, may be to decrease, may be to first increase and then decrease, may be to first decrease and then increase, or may be a form of adjustment process with repeated oscillations. It is to be understood that the preceding adjustment process of the peak current of the first switching transistor M1 may be changed adaptively according to the settings and parameter selection of the switching power supply. In addition, the manner in which the primary control module K1 adjusts the peak current of the first switching transistor M1 may be achieved by adjusting the peak current according to the switching frequency of the first switching transistor M1 to optimize the efficiency of the switching power supply.

In S140, in the case where the peak current of the first switching transistor reaches the preset value, the primary control module controls the first switching transistor to be turned off.

The preset value refers to a fixed or adjustable current value. The preset value may be set as the initial setup value of the switching power supply or may be set according to a specific algorithm.

In S150, after the first switching transistor is turned off, the secondary control module controls the second switching transistor to be turned on.

In S160, in the case where the switching current of the second switching transistor is at a current zero-crossing point, the secondary control module controls the second switching transistor to be turned off.

The current zero-crossing point corresponds to the moment when the switching current of the second switching transistor M2 is zero. It is to be understood that in the case where the switching current of the second switching transistor M2 is at the current zero-crossing point, the secondary control module K2 controls the second switching transistor M2 to be turned off, which means that at the moment when the switching current of the second switching transistor M2 is zero, the secondary control module K2 controls the second switching transistor M2 to be turned off.

It can be seen that the primary control module K1 and the secondary control module K2 may be any type of control chip or circuit. It is to be noted that the primary control module K1 and the secondary control module K2, regardless of the circuit used, only need to be able to achieve the corresponding control functions. There is no limit to the internal implementation of the chip or circuit.

The switching power supply control method provided in the embodiments of the present application includes: after the high-voltage startup of the switching power supply, secondary control module adjusts the cut-off current of the second switching transistor according to a voltage waveform at a second connection point between the secondary winding and the second switching transistor until a voltage waveform at a first connection point between the primary winding and the first switching transistor just reaches zero; in the case where the voltage waveform at the first connection point just reaches zero, the primary control module controls the first switching transistor to be turned on to achieve the zero-voltage turn-on of the primary side; after the zero-voltage turn-on of the primary side, the primary control module adjusts the peak current of the first switching transistor until the peak current of the first switching transistor reaches a preset value; in the case where the peak current of the first switching transistor reaches the preset value, the primary control module controls the first switching transistor to be turned off, after the first switching transistor is turned off, the secondary control module controls the second switching transistor to be turned on; and in the case where the switching current of the second switching transistor is at a current zero-crossing point, the secondary control module controls the second switching transistor to be turned off.

Compared with the typical flyback AC-DC isolated switching power supply in the related technologies, the embodiments eliminate circuit structures such as the opto-coupler or other isolated converters so that the circuit cost and control complexity of the switching power supply are reduced. Furthermore, the embodiments incorporate the advantages of secondary side feedback control strategies, including fast loop response speed and broad applicability to various fast charging protocols. In addition, the typical flyback AC-DC isolated switching power supply cannot achieve ZVS. In the embodiments of the present application, the secondary control module K2 acquires the voltage waveform at a second connection point B and adjusts the cut-off current of the second switching transistor M2; and the primary control module K1 controls the first switching transistor M1 to be turned on in the case where the voltage waveform at the first connection point A just reaches zero. In the embodiments of the present application, the turn-on of the first switching transistor M1 through the control of the secondary control module is achieved and the ZVS of the switching power supply is ultimately achieved. In this manner, not only the switching losses of the switching power supply is reduced but also the EMI characteristics of the switching power supply is improved.

Compared with the active clamp flyback AC-DC isolated switching power supply in the related technologies, the embodiments of the present application do not require additional control loops and corresponding hardware circuit structures. Therefore, the circuit structure of the switching power supply is simplified, and the hardware costs of the switching power supply are reduced, which is conducive to simplifying the control loops of the switching power supply.

Compared with the primary side regulation feedback control method in the related technologies, the embodiment of the present application achieves the secondary side feedback and control on the basis of eliminating components such as the optocoupler, which is conducive to supporting various fast charging protocols and improving the control loop response speed.

In an embodiment, the present application can simplify the circuit structure of the switching power supply, reduce the hardware costs of the switching power supply, reduce the switching losses of the switching power supply, and improve the EMI characteristics of the switching power supply.

It is to be noted that the peak current of the first switching transistor M1 is closely related to the conduction duration of the first switching transistor M1. The longer the conduction duration, the greater the peak current. Correspondingly, the shorter the conduction duration, the smaller the peak current. For example, in other embodiments, after the zero-voltage turn-on of the primary side, the primary control module K1 may adjust the conduction duration of the first switching transistor M1 until the conduction duration of the first switching transistor M1 reaches a duration reference value; and in the case where the conduction duration of the first switching transistor M1 reaches the duration reference value, the primary control module K1 controls the first switching transistor M1 to be turned off. Based on this, FIG. 3 is a flowchart of another switching power supply control method according to an embodiment of the present application. Referring to FIG. 3, the control flow of the switching power supply shown in S210 to S260 is described below.

Firstly, after the high-voltage startup of the switching power supply, the secondary control module K2 adjusts the cut-off current of the second switching transistor M2 according to the voltage waveform at the second connection point B between the secondary winding X2 and the second switching transistor M2 until the voltage waveform at the first connection point A between the primary winding X1 and the first switching transistor M1 just reaches zero. Secondly, in the case where the voltage waveform at the first connection point A just reaches zero, the primary control module K1 controls the first switching transistor M1 to be turned on to achieve the zero-voltage turn-on of the primary side. Thirdly, after the zero-voltage turn-on of the primary side, the primary control module K1 adjusts the conduction duration of the first switching transistor M1 until the conduction duration of the first switching transistor M1 reaches the duration reference value. Fourthly, in the case where the conduction duration of the first switching transistor M1 reaches the duration reference value, the primary control module K1 controls the first switching transistor M1 to be turned off. Fifthly, after the first switching transistor M1 is turned off, the secondary control module K2 controls the second switching transistor M2 to be turned on. Finally, in the case where the switching current of the second switching transistor M2 is at the current zero-crossing point, the secondary control module K2 controls the second switching transistor M2 to be turned off.

It can be seen that, on the one hand, compared with the typical flyback AC-DC isolated switching power supply in the related technologies, the technical solution of this embodiment not only reduces the circuit cost and control complexity of the switching power supply but also achieves the ZVS of the switching power supply, effectively reduces the switching losses of the switching power supply, and improves the EMI characteristics of the switching power supply. On the other hand, compared with the active clamp flyback AC-DC isolated switching power supply in the related technologies, the embodiments do not require components such as optocouplers which not only simplify the circuit structure of the switching power supply, reduce the hardware costs of the switching power supply, and contribute to simplifying the control loops of the switching power supply, but also achieve the secondary side feedback and control, and contribute to improving the reliability of the switching power supply.

Based on the preceding solution, FIG. 4 is a flowchart of another switching power supply control method according to an embodiment of the present application. Referring to FIG. 1, optionally, the switching power supply further includes an auxiliary winding X3 and a first voltage divider circuit E1, where the first voltage divider circuit E1 is connected between the auxiliary winding X3 and a voltage detection terminal of the primary control module K1. With continued reference to FIG. 1, optionally, the switching power supply further includes an absorption circuit Q connected in parallel to two ends of the primary winding X1, where the absorption circuit Q includes a fifth resistor R5 and a first capacitor C1 connected in series with each other. As shown in FIG. 4, the switching power supply control method provided in this embodiment includes the steps described below.

In S310, after the high-voltage startup of the switching power supply, the secondary control module acquires the voltage waveform at the second connection point between the secondary winding and the second switching transistor.

In S320, in the case where the voltage waveform at the second connection point has not achieved zero-voltage switching, the secondary control module adjusts the cut-off current of the second switching transistor until the voltage waveform at the first connection point between the primary winding and the first switching transistor just reaches zero.

It can be seen that the voltage waveform at the second connection point B has not achieved zero-voltage switching, indicating that the switching power supply has not achieved ZVS. In this case, the switching losses of the switching power supply are relatively large, the efficiency is relatively low, and the EMI is severe.

In S330, in the case where the primary control module detects, through the first voltage divider circuit, that the voltage waveform at the first connection point just reaches zero, the primary control module controls the first switching transistor to be turned on to achieve the zero-voltage turn-on of the primary side.

In the circuit structure of the typical flyback AC-DC isolated switching power supply, since the voltage detection terminal of the primary control module K1 is not directly connected to the first connection point A, the primary control module K1 cannot directly acquire the voltage waveform at the first connection point A.

Based on this, in the embodiments of the present application, the typical flyback AC-DC isolated switching power supply is configured with the auxiliary winding X3 and the first voltage divider circuit E1, and the first voltage divider circuit E1 is connected between the auxiliary winding X3 and the voltage detection terminal of the primary control module K1 so that the voltage waveform at the first connection point A can be indirectly acquired through the first voltage divider circuit E1.

For example, in other embodiments, in the case where the primary control module K1 detects, through the first voltage divider circuit E1, that the minimum value of the voltage waveform at the first connection point A approaches zero, the primary control module K1 may control the first switching transistor M1 to be turned on to achieve the zero-voltage turn-on of the primary side.

In S340, after the zero-voltage turn-on of the primary side, the primary control module adjusts the peak current of the first switching transistor until the peak current of the first switching transistor reaches a preset value.

In S350, in the case where the peak current of the first switching transistor reaches the preset value, the primary control module controls the first switching transistor to be turned off.

In S360, after the first switching transistor is turned off, the secondary control module controls the second switching transistor to be turned on.

In S370, in the case where the switching current of the second switching transistor is at a current zero-crossing point, the secondary control module controls the second switching transistor to be turned off.

In an embodiment, at the moment when the switching current of the second switching transistor is at the current zero-crossing point, the secondary control module controls the second switching transistor to be turned off.

To sum up, compared with the related technologies, the technical solution of the embodiments eliminates the coupling components between the primary side and the secondary side, thereby reducing the additional circuit costs and the complexity of the circuit. Moreover, on the basis of reducing the additional circuit costs and controlling the complexity of the circuit, the switching losses of the switching power supply can also be reduced and the EMI characteristics of the switching power supply can be improved. In addition, this embodiment implements the secondary side feedback control, which is conducive to improving the output dynamic response performance of the switching power supply and can be consistent with the practical application of various fast charging protocols.

Based on the preceding embodiments, the method for adjusting the output voltage Vout of the switching power supply under ZVS is described below. With continued reference to FIG. 1, optionally, the switching power supply further includes a second voltage divider circuit E2, where the second voltage divider circuit E2 is connected between the secondary winding X2 and an output voltage detection terminal of the secondary control module K2. FIG. 5 is a flowchart of another switching power supply control method according to an embodiment of the present application. As shown in FIG. 5, the switching power supply control method provided in the embodiments includes the steps described below.

In S410, after the high-voltage startup of the switching power supply, the secondary control module acquires the voltage waveform at the second connection point between the secondary winding and the second switching transistor.

In S420, in the case where the voltage waveform at the second connection point has not achieved zero voltage switching, the secondary control module adjusts the cut-off current of the second switching transistor until the voltage waveform at the first connection point between the primary winding and the first switching transistor just reaches zero.

In S430, in the case where the primary control module detects, through the first voltage divider circuit, that the voltage waveform at the first connection point just reaches zero, the primary control module controls the first switching transistor to be turned on to achieve the zero-voltage turn-on of the primary side.

In S440, after the zero-voltage turn-on of the primary side, the primary control module adjusts the peak current of the first switching transistor until the peak current of the first switching transistor reaches a preset value.

In S450, in the case where the peak current of the first switching transistor reaches the preset value, the primary control module controls the first switching transistor to be turned off.

In S460, after the first switching transistor is turned off, the secondary control module controls the second switching transistor to be turned on.

In S470, in the case where the switching current of the second switching transistor is at a current zero-crossing point, the secondary control module controls the second switching transistor to be turned off.

In S480, in the case where the secondary control module detects, through the second voltage divider circuit, that the output load of the switching power supply changes, the secondary control module controls the frequency at which the voltage waveform at the second connection point reaches a high level, so as to adjust the output voltage of the switching power supply.

Figure 6:
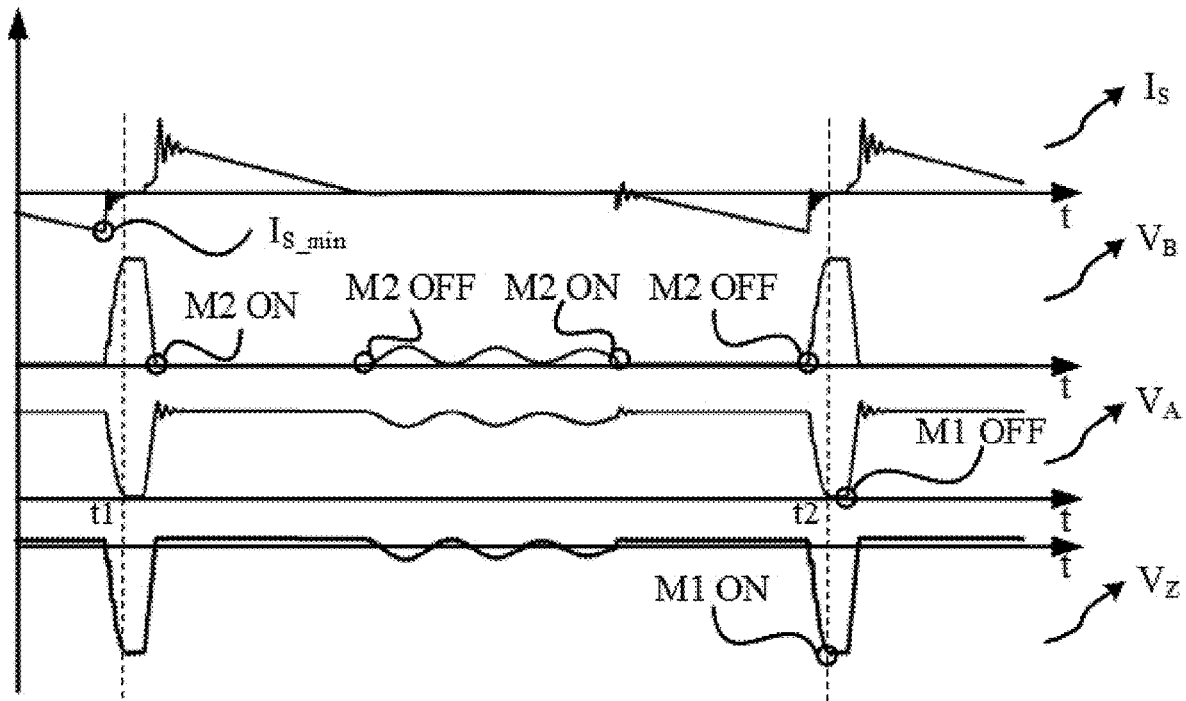
FIG. 6 is a schematic diagram illustrating waveforms of a switching power supply according to an embodiment of the present application.

It can be seen that in the case where the voltage at the first connection point A reaches zero, according to the transformer coupling principle, the voltage at the second connection point B rises to a certain value according to the ratio of the primary winding to the secondary winding. Referring to FIG. 6, at moment t1, the voltage $V_A$ at the first connection point A reaches zero, and the voltage $V_B$ at the second connection point rises to a certain value, that is, reaches a high level; at moment t2, the voltage $V_A$ reaches zero again, and the voltage $V_B$ rises to a certain value, that is, reaches the high level again. According to the time interval between t1 and t2, the time interval for the voltage waveform at the second connection point B to reach the high level may be determined. Based on the principle that the time interval for reaching the high level is inversely proportional to the frequency for reaching the high level, the frequency for the voltage waveform at the second connection point B to reach the high level may be determined.

In an embodiment, referring to FIG. 6, the moment when the voltage $V_A$ at the first connection point A reaches zero may be determined by detecting the moment when the voltage $V_Z$ at a third connection point Z drops to a certain value, that is, reaches a low level.

In the case where the voltage waveform at the second connection point B reaches the high level, the voltage waveform at the first connection point A reaches zero. Based on this, in other embodiments, in the case where the secondary control module K2 detects, through the second voltage divider circuit E2, a change in output load of the switching power supply, the secondary control module K2 may control, according to the current output voltage of the switching power supply, the frequency at which the voltage waveform at the first connection point A reaches zero, thereby achieving the loop adjustment for stabilizing the output voltage of the switching power supply.

It is to be understood that the frequency at which the voltage waveform at the second connection point B reaches the high level is related to the time interval for the voltage waveform at the second connection point B to reach the high level. Therefore, in other embodiments, in the case where the secondary control module K2 detects, through the second voltage divider circuit E2, a change in output load of the switching power supply, the secondary control module K2 controls the time interval for the voltage waveform at the second connection point B to reach the high level, so as to adjust the output voltage of the switching power supply.

Correspondingly, the frequency at which the voltage waveform at the first connection point A reaches zero is related to the time interval for the voltage waveform at the first connection point A to reach zero. It can be seen that, in other embodiments, in the case where the secondary control module K2 detects, through the second voltage divider circuit E2, a change in output load of the switching power supply, the secondary control module K2 may control, according to the current output voltage of the switching power supply, the time interval for the voltage waveform at the first connection point A to reach zero, thereby achieving the loop adjustment for stabilizing the output voltage of the switching power supply.

Based on this and the implementation of the ZVS of the switching power supply in the preceding embodiments, in this embodiment, the loop control for stabilizing the output voltage of the switching power supply can be achieved in the case where the output load of the switching power supply changes. Compared with the related technologies, the technical solution of the embodiments eliminates the coupling components between the primary side and the secondary side thereby reducing the additional circuit costs and the complexity of the circuit. Moreover, on the basis of reducing the additional circuit costs and controlling the complexity of the circuit, the switching losses of the switching power supply can also be reduced and the EMI characteristics of the switching power supply can be improved. In addition, this embodiment implements the secondary side feedback control, which is conducive to improving the output dynamic response performance of the switching power supply and can be consistent with the practical application of various fast charging protocols.

With continued reference to FIG. 1, the switching power supply includes the primary winding X1, the secondary winding X2, the primary control module K1, the secondary control module K2, the first switching transistor M1 connected to the primary winding X1, and the second switching transistor M2 connected to the secondary winding X2.

The primary winding X1 is configured to store energy in the case where the first switching transistor M1 is turned on.

The secondary winding X2 is configured to generate the output voltage Vout in the case where the second switching transistor M2 is turned on.

The first switching transistor M1 is configured to be turned on or off according to a drive signal generated by the primary control module K1.

The second switching transistor M2 is configured to be turned on or off according to a drive signal generated by the secondary control module K2.

The primary control module K1 is configured to, in the case where the voltage waveform at the first connection point A just reaches zero, control the first switching transistor M1 to be turned on; adjust the peak current of the first switching transistor M1 after the zero-voltage turn-on of the primary side; and in the case where the peak current of the first switching transistor M1 reaches a preset value, control the first switching transistor M1 to be turned off.

The secondary control module K2 is configured to, after the high-voltage startup of the switching power supply, adjust the cut-off current of the second switching transistor M2 according to the voltage waveform at the second connection point B between the secondary winding X2 and the second switching transistor M2; after the first switching transistor M1 is turned off, control the second switching transistor M2 to be turned on; and in the case where the switching current of the second switching transistor M2 is at the current zero-crossing point, control the second switching transistor M2 to be turned off.

As an example, the first switching transistor M1 and the second switching transistor M2 may be metal-oxide-semiconductor field-effect transistors (MOSFETs). It is to be understood that the type selection and structural parameters of the first switching transistor M1 and the second switching transistor M2 are related to the power supply requirement to be achieved.

In addition, the primary control module K1 may be further configured to, after the zero-voltage turn-on of the primary side, adjust the conduction duration of the first switching transistor M1 until the conduction duration of the first switching transistor M1 reaches the duration reference value; and in the case where the conduction duration of the first switching transistor M1 reaches the duration reference value, control the first switching transistor M1 to be turned off.

It is to be understood that the primary control module K1 may be further configured to, upon detecting through the first voltage divider circuit E1 that the voltage waveform at the first connection point A approaches zero at its valley, control the first switching transistor M1 to be turned on. In this manner, the zero-voltage turn-on of the primary side is achieved.

It can be seen that the secondary control module K2 may be further configured to, upon detecting a change in output load of the switching power supply through the second voltage divider circuit E2, control the frequency at which the voltage waveform at the first connection point A reaches zero according to the current output voltage of the switching power supply, or control the frequency at which the voltage waveform at the second connection point B reaches a high level according to the current output voltage of the switching power supply. In this manner, the loop adjustment for stabilizing the output voltage Vout of the switching power supply is achieved.

It is to be understood that the secondary control module K2 may be further configured to, upon detecting a change in output load of the switching power supply through the second voltage divider circuit E2, control the time interval for the voltage waveform at the second connection point B to reach a high level or the time interval for the voltage waveform at the first connection point A to reach zero. In this manner, the output voltage of the switching power supply is adjusted.

Optionally, the switching power supply further includes the auxiliary winding X3 and the first voltage divider circuit E1, where the first voltage divider circuit E1 includes a first resistor R1 and a second resistor R2.

The auxiliary winding X3 is configured to provide electrical power for the primary control module K1.

The first voltage divider circuit E1 is configured to generate a first voltage divider signal so that the primary control module K1 acquires the voltage waveform at the first connection point A.

In an embodiment, the first voltage divider signal may be a voltage signal. It can be seen that the first voltage divider signal is used as an input signal to the primary control module K1 and is used for providing a basis for the primary control module K1 to acquire the voltage waveform at the first connection point A.

Optionally, the switching power supply further includes the second voltage divider circuit E2, where the second voltage divider circuit E2 includes a third resistor R3 and a fourth resistor R4.

The second voltage divider circuit E2 is configured to generate a second voltage divider signal so that the secondary control module K2 acquires the output voltage Vout of the switching power supply.

In an embodiment, the second voltage divider signal may be a voltage signal. It can be seen that the second voltage divider signal is used as an input signal to the secondary control module K2 and is used for providing a basis for the secondary control module K2 to acquire the output voltage Vout of the switching power supply.

In an embodiment, the switching power supply further includes the absorption circuit Q, where the absorption circuit Q includes a fifth resistor R5 and a first capacitor C1 connected in series with each other.

It is to be understood that compared with the clamp absorption circuits widely used in related technologies, which typically consist of resistors, capacitors, and diodes, the absorption circuit Q provided in the embodiment of the present application can implement a simpler clamp absorption function, thereby reducing the hardware costs of the switching power supply, optimizing the switching losses of the system, and improving the EMI characteristics of the switching power supply.

It is to be noted that the first resistor R1, the second resistor R2, the third resistor R3, the fourth resistor R4, and the fifth resistor R5 may be any type of resistors, and the types and parameters of the preceding resistors may be adaptively adjusted according to the power supply requirement to be achieved by the switching power supply. For example, the preceding resistors may be surface mount device (SMD) resistors.

Further, it is to be noted that the first capacitor C1 may be any type of capacitor, and the type and parameters of the capacitor may be adaptively adjusted according to the power supply requirement to be achieved by the switching power supply. For example, the first capacitor C1 may be a mica capacitor.

In addition, the circuit element connection relationship of the switching power supply based on the typical flyback AC-DC isolated switching power supply topology provided in the embodiment of the present application is shown in FIG. 1.

With continued reference to FIG. 1, the working process of the switching power supply is described below.

Firstly, after the high-voltage startup of the switching power supply, the secondary control module K2 acquires the voltage waveform at the second connection point B between the secondary winding X2 and the second switching transistor M2. Secondly, in the case where the voltage waveform at the second connection point B has not achieved zero voltage switching, the secondary control module K2 adjusts the cut-off current of the second switching transistor M2 until the voltage waveform at the first connection point A between the primary winding X1 and the first switching transistor M1 just reaches zero. Thirdly, in the case where the primary control module K1 detects, through the first voltage divider circuit E1, that the voltage waveform at the first connection point A just reaches zero, the primary control module K1 controls the first switching transistor M1 to be turned on to achieve the zero-voltage turn-on of the primary side. Fourthly, after the zero-voltage turn-on of the primary side, the primary control module K1 adjusts the peak current of the first switching transistor M1 until the peak current of the first switching transistor M1 reaches a preset value. Fifthly, in the case where the peak current of the first switching transistor M1 reaches the preset value, the primary control module K1 controls the first switching transistor M1 to be turned off. Sixthly, after the first switching transistor M1 is turned off, the secondary control module K2 controls the second switching transistor M2 to be turned on. Seventhly, in the case where the switching current of the second switching transistor M2 is at the current zero-crossing point, the secondary control module K2 controls the second switching transistor M2 to be turned off. Finally, in the case where the secondary control module K2 detects, through the second voltage divider circuit E2, that the output load of the switching power supply changes, the secondary control module K2 controls the frequency at which the voltage waveform at the second connection point B reaches a high level, so as to adjust the output voltage Vout of the switching power supply.

It is to be noted that, the secondary control module K2 in the embodiments of the present application may be integrated with a typical 431 voltage reference module (a type of voltage reference chip) or another voltage reference module internally. Alternatively, it may use an external 431 voltage reference module or another voltage reference module. Both methods allow for the comparison between the output voltage Vout of the switching power supply and the reference voltage provided by the 431 voltage reference module, thereby achieving controllable loop regulation of the output voltage Vout of the switching power supply.

FIG. 6 is a schematic diagram illustrating waveforms of a switching power supply according to an embodiment of the present application. Referring to the working process of the preceding switching power supply and FIG. 6, it can be seen that in the case where the waveform of the voltage $V_A$ at the first connection point A just reaches zero, the waveform of the voltage $V_B$ at the second connection point B just reaches a high level, and the waveform of the voltage $V_z$ at the third connection point Z just reaches a low level. In addition, at the moment when the second switching transistor M2 is turned off, the switching current $I_S$ of the second switching transistor M2 reaches the cut-off current $I_{S\_min}$. In FIG. 6, M1 ON indicates that the first switching transistor M1 is turned on, and M1 OFF indicates that the first switching transistor M1 is turned off; M2 ON indicates that the second switching transistor M2 is turned on, and M2 OFF indicates that the second switching transistor M2 is turned off, $I_S$ denotes the current flowing between the source and drain of the second switching transistor M2. In an embodiment, when the second switching transistor M2 is in an on state, the voltage difference between the source and drain of M2 may be collected so as to calculate the switching current $I_S$.

It can be seen that compared with the related technologies, while reducing additional circuit costs and control complexity, the technical solution of this embodiment can achieve the ZVS of the switching power supply in any state such as a light load state or a heavy load state according to the change in output load of the switching power supply, thereby not only reducing the switching losses of the switching power supply but also improving the EMI characteristics of the switching power supply.

Based on the preceding embodiments, optionally, the primary control module K1 in the embodiments of the present application may be internally integrated with a voltage reference module such as a typical 431 voltage reference module, or it may use an external voltage reference module. Both methods allow for the comparison between the output voltage Vout of the switching power supply and the reference voltage provided by the voltage reference module through the first voltage divider circuit E1, thereby achieving controllable loop regulation of the output voltage Vout of the switching power supply.

Based on this, for example, FIG. 7 is a flowchart of another switching power supply control method according to an embodiment of the present application. Compared with the switching power supply control method shown in FIG. 5, the switching power supply control method shown in FIG. 7 is completely different in terms of the method for adjusting the output voltage of the switching power supply. Reference is made to the control flow of the switching power supply shown in S510 to S580 in FIG. 7.

For the actual working condition where the output voltage Vout is relatively fixed, in the case where the switching current $I_S$ of the second switching transistor M2 is greater than a first preset value or the switching frequency of the second switching transistor M2 is greater than a first preset frequency value, the secondary control module K2 enters the heavy load ZVS mode, and correspondingly, the primary control module K1 also enters the heavy load ZVS mode by detecting the voltage waveform at the first connection point A. At this time, the primary control module K1 collects the feedback signal of the output voltage Vout through the first voltage divider circuit E1, compares the feedback signal of the output voltage Vout with the module reference voltage of the primary control module K1, and achieves the loop control for stabilizing the output voltage of the switching power supply by adjusting the switching current of the first switching transistor M1. In an embodiment, the switching current of the first switching transistor M1 refers to the current flowing between the source and drain of the first switching transistor M1. When the first switching transistor M1 is in the on state, the voltage at the source of M1 may be collected, so as to calculate the current flowing through the resistor Rs to obtain the switching current of the first switching transistor M1.

Figure 8:
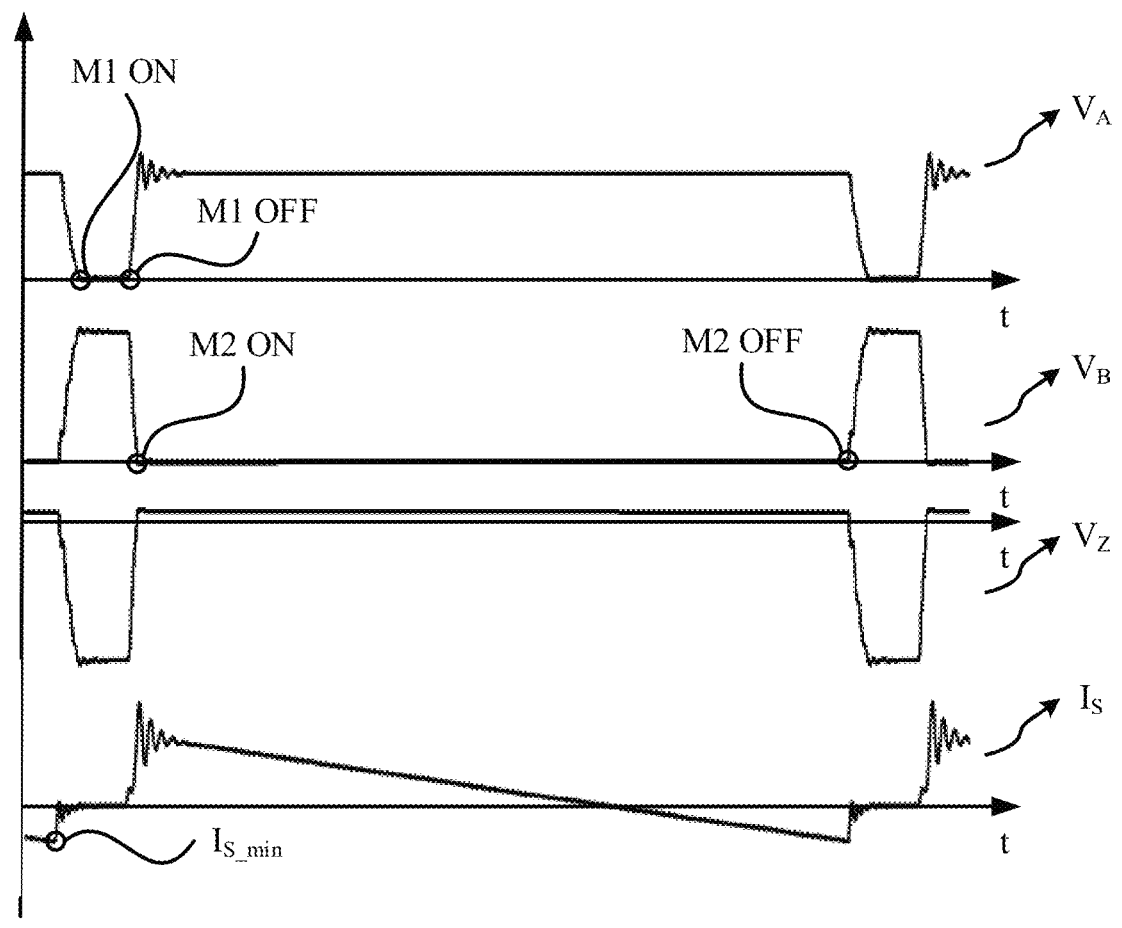
FIG. 8 is a schematic diagram illustrating waveforms of another switching power supply according to an embodiment of the present application.

For example, FIG. 8 is a schematic diagram illustrating waveforms of another switching power supply according to an embodiment of the present application. Referring to the working process of the preceding switching power supply in the heavy load ZVS mode and FIG. 8, it can be seen that in the case where the waveform of the voltage $V_A$ at the first connection point A just reaches zero, the waveform of the voltage $V_B$ at the second connection point B just reaches a high level, and the waveform of the voltage $V_z$ at the third connection point Z just reaches a low level. In addition, at the moment when the second switching transistor M2 is turned off, the switching current $I_S$ of the second switching transistor M2 reaches the cut-off current $I_{S\_min}$.

In the case where the switching current $I_S$ of the second switching transistor M2 is less than or equal to the first preset value or the switching frequency of the second switching transistor M2 is less than or equal to the first preset frequency value, the switching power supply is in the light load ZVS state. In this case, in this embodiment, the loop control for stabilizing the output voltage of the switching power supply is achieved according to the control flow shown in S410 to S480.

Figure 9:
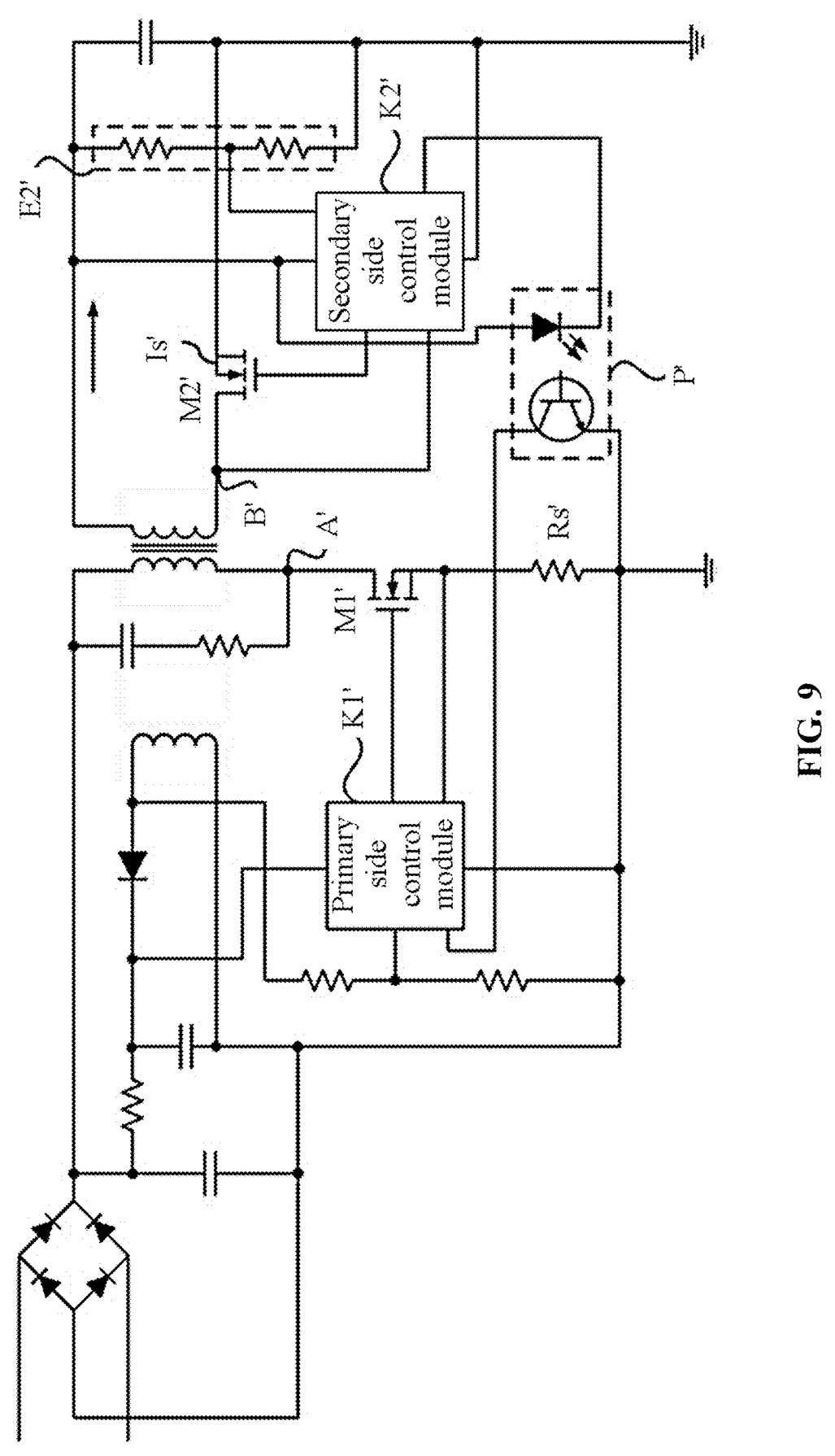
FIG. 9 is a structural diagram of another switching power supply according to an embodiment of the present application.

Based on the preceding embodiments, for example, FIG. 9 is a structural diagram of another switching power supply according to an embodiment of the present application. Referring to FIG. 9, it can be seen that compared with the switching power supply structure shown in FIG. 1, the technical solution of this embodiment adds an optocoupler P between a primary side control module K1' and a secondary side control module K2'. Based on the switching power supply shown in FIG. 9, FIG. 10 is a flowchart of another switching power supply control method according to an embodiment of the present application. Referring to FIG. 10, the control flow of the switching power supply shown in S610 to S670 is described below.

After the high-voltage startup of the switching power supply, the secondary side control module K2' adjusts the cut-off current of a fourth switching transistor M2' according to the voltage waveform at a fourth connection point B' between a secondary side winding and the fourth switching transistor M2' until the voltage waveform at a third connection point A' between a primary side winding and a third switching transistor M1' just reaches zero. In the case where the voltage waveform at the third connection point A' just reaches zero, the primary side control module K1' controls the third switching transistor M1' to be turned on to achieve the zero-voltage turn-on of the primary side. After the zero-voltage turn-on of the primary side, the primary side control module K1' adjusts the peak current of the third switching transistor M1' until the peak current of the third switching transistor M1' reaches a preset value. In the case where the peak current of the third switching transistor M1' reaches the preset value, the primary side control module K1' controls the third switching transistor M1' to be turned off. After the third switching transistor M1' is turned off, the secondary side control module K2' controls the fourth switching transistor M2' to be turned on. In the case where the switching current of the fourth switching transistor M2' is at the current zero-crossing point, the secondary side control module K2' controls the fourth switching transistor M2' to be turned off. In the case where the switching current $I_S'$ of the fourth switching transistor M2' is greater than a second preset value or the switching frequency of the fourth switching transistor M2' is greater than a second preset frequency value, the secondary side control module K2' enters the heavy load ZVS mode, and the primary side control module K1' also enters the heavy load ZVS mode after detecting the voltage waveform at the third connection point A'. In this case, the primary side control module K1' adjusts the switching current of the third switching transistor M1' according to the feedback signal from the optocoupler P', thereby achieving the loop control for stabilizing the output voltage of the switching power supply. It is to be understood that the secondary side control module K2' may generate a drive signal for the optocoupler P according to the feedback signal from a voltage divider circuit E2' so that the primary side control module K1' can learn the change in output voltage of the switching power supply.

In an embodiment, $I_S'$ denotes the current flowing between the source and drain of the fourth switching transistor M2'. When the fourth switching transistor M2' is in the on state, the voltage difference between the source and drain of M2' may be collected, so as to calculate the switching current $I_S'$. The switching current of the third switching transistor M1' refers to the current flowing between the source and drain of the third switching transistor M1'. When the third switching transistor M1' is in the on state, the voltage at the source of M1' may be collected, so as to calculate the current flowing through the resistor Rs' to obtain the switching current of the third switching transistor M1'.

In the case where the switching current $I_S'$ of the fourth switching transistor M2' is less than or equal to the second preset value or the switching frequency of the fourth switching transistor M2' is less than or equal to the second preset frequency value, the switching power supply is in the light load ZVS state. In this case, in this embodiment, the loop control for stabilizing the output voltage of the switching power supply is achieved according to the control flow shown in S410 to S480.

It can be seen that the primary side control module K1' and the secondary side control module K2' may be any type of control chip or circuit. It is to be noted that no matter which circuits are used by the primary side control module K1' and the secondary side control module K2', there is no limit to the implementation inside the chip or circuit as long as the corresponding control functions can be implemented.

What is claimed is:

1. A switching power supply control method, wherein a switching power supply comprises a primary winding, a secondary winding, a primary control module, a secondary control module, a first switching transistor connected to the primary winding, and a second switching transistor connected to the secondary winding;

wherein the switching power supply control method comprises:

after high-voltage startup of the switching power supply, adjusting, by the secondary control module, a cut-off current of the second switching transistor according to a voltage waveform at a second connection point between the secondary winding and the second switching transistor until a voltage waveform at a first connection point between the primary winding and the first switching transistor just reaches zero;

in response to that the voltage waveform at the first connection point just reaches zero, controlling, by the primary control module, the first switching transistor to be turned on to achieve zero-voltage turn-on of a primary side;

after the zero-voltage turn-on of the primary side, adjusting, by the primary control module, a peak current of the first switching transistor until the peak current of the first switching transistor reaches a preset value;

in response to that the peak current of the first switching transistor reaches the preset value, controlling, by the primary control module, the first switching transistor to be turned off;

after the first switching transistor is turned off, controlling, by the secondary control module, the second switching transistor to be turned on; and in response to a switching current of the second switching transistor being at a current zero-crossing point, controlling, by the secondary control module, the second switching transistor to be turned off.

2. The method of claim 1, wherein after the high-voltage startup of the switching power supply, adjusting, by the secondary control module, the cut-off current of the second switching transistor according to the voltage waveform at the second connection point between the secondary winding and the second switching transistor until the voltage waveform at the first connection point between the primary winding and the first switching transistor just reaches zero comprises:

after the high-voltage startup of the switching power supply, acquiring, by the secondary control module, the voltage waveform at the second connection point between the secondary winding and the second switching transistor; and in response to that the voltage waveform at the second connection point has not achieved zero voltage switching (ZVS), adjusting, by the secondary control module, the cut-off current of the second switching transistor until the voltage waveform at the first connection point between the primary winding and the first switching transistor just reaches zero.

3. The method of claim 2, wherein the switching power supply further comprises an auxiliary winding and a first voltage divider circuit, wherein the first voltage divider circuit is connected between the auxiliary winding and a voltage detection terminal of the primary control module;

wherein in response to that the voltage waveform at the first connection point just reaches zero, controlling, by the primary control module, the first switching transistor to be turned on to achieve the zero-voltage turn-on of the primary side comprises:

in response to detecting that the voltage waveform at the first connection point just reaches zero by the primary control module through the first voltage divider circuit, controlling, by the primary control module, the first switching transistor to be turned on to achieve the zero-voltage turn-on of the primary side.

4. The method of claim 2, further comprising:

in response to that an output load of the switching power supply changes, controlling, by the secondary control module, a frequency at which the voltage waveform at the second connection point reaches a high level, so as to adjust an output voltage of the switching power supply.

5. The method of claim 2, further comprising:

in response to an output voltage of the switching power supply being relatively fixed and the switching current of the second switching transistor is greater than a first preset value, controlling, by the primary control module, a switching current of the first switching transistor according to a feedback signal of the output voltage of the switching power supply to adjust the output voltage of the switching power supply.

6. The method of claim 1, wherein the switching power supply further comprises an auxiliary winding and a first voltage divider circuit, wherein the first voltage divider circuit is connected between the auxiliary winding and a voltage detection terminal of the primary control module;

wherein in response to that the voltage waveform at the first connection point just reaches zero, controlling, by the primary control module, the first switching transistor to be turned on to achieve the zero-voltage turn-on of the primary side comprises:

in response to detecting that the voltage waveform at the first connection point just reaches zero by the primary control module through the first voltage divider circuit, controlling, by the primary control module, the first switching transistor to be turned on to achieve the zero-voltage turn-on of the primary side.

7. The method of claim 6, further comprising:

in response to that an output load of the switching power supply changes, controlling, by the secondary control module, a frequency at which the voltage waveform at the second connection point reaches a high level, so as to adjust an output voltage of the switching power supply.

8. The method of claim 6, further comprising:

in response to an output voltage of the switching power supply being relatively fixed and the switching current of the second switching transistor is greater than a first preset value, controlling, by the primary control module, a switching current of the first switching transistor according to a feedback signal of the output voltage of the switching power supply to adjust the output voltage of the switching power supply.

9. The method of claim 6, further comprising:

in response to an output voltage of the switching power supply being relatively fixed and the switching current of the second switching transistor is greater than a first preset value, controlling, by the primary control module, a switching current of the first switching transistor according to a feedback signal of the output voltage of the switching power supply to adjust the output voltage of the switching power supply.

10. The method of claim 1, further comprising:

in response to that an output load of the switching power supply changes, controlling, by the secondary control module, a frequency at which the voltage waveform at the second connection point reaches a high level, so as to adjust an output voltage of the switching power supply.

11. The method of claim 10, wherein the switching power supply further comprises a second voltage divider circuit, wherein the second voltage divider circuit is connected between the secondary winding and an output voltage detection terminal of the secondary control module;

wherein in response to that the output load of the switching power supply changes, controlling, by the secondary control module, the frequency at which the voltage waveform at the second connection point reaches the high level, so as to adjust the output voltage of the switching power supply comprises:

in response to detecting that the output load of the switching power supply changes by the secondary control module through the second voltage divider circuit, controlling, by the secondary control module, the frequency at which the voltage waveform at the second connection point reaches the high level, so as to adjust the output voltage of the switching power supply.

12. The method of claim 1, further comprising:

in response to an output voltage of the switching power supply being relatively fixed and the switching current of the second switching transistor is greater than a first preset value, controlling, by the primary control module, a switching current of the first switching transistor according to a feedback signal of the output voltage of the switching power supply to adjust the output voltage of the switching power supply.

13. A switching power supply, comprising a primary winding, a secondary winding, a primary control module, a secondary control module, a first switching transistor connected to the primary winding, and a second switching transistor connected to the secondary winding;

wherein the primary winding is configured to store energy in a case where the first switching transistor is turned on;

the secondary winding is configured to generate an output voltage in a case where the second switching transistor is turned on;

the first switching transistor is configured to be turned on or off according to a drive signal generated by the primary control module;

the second switching transistor is configured to be turned on or off according to a drive signal generated by the secondary control module;

the primary control module is configured to, in a case where a voltage waveform at a first connection point just reaches zero, control the first switching transistor to be turned on; adjust a peak current of the first switching transistor after zero-voltage turn-on of a primary side; and in a case where the peak current of the first switching transistor reaches a preset value, control the first switching transistor to be turned off; and the secondary control module is configured to, after high-voltage startup of the switching power supply, adjust a cut-off current of the second switching transistor according to a voltage waveform at a second connection point between the secondary winding and the second switching transistor; after the first switching transistor is turned off, control the second switching transistor to be turned on; and in a case where a switching current of the second switching transistor is at a current zero-crossing point, control the second switching transistor to be turned off.

14. The switching power supply of claim 13, further comprising an auxiliary winding and a first voltage divider circuit, wherein the first voltage divider circuit comprises a first resistor and a second resistor;

the auxiliary winding is configured to provide electrical power for the primary control module; and the first voltage divider circuit is configured to generate a first voltage divider signal so that the primary control module acquires the voltage waveform at the first connection point.

15. The switching power supply of claim 14, further comprising a second voltage divider circuit, wherein the second voltage divider circuit comprises a third resistor and a fourth resistor; and the second voltage divider circuit is configured to generate a second voltage divider signal so that the secondary control module acquires an output voltage of the switching power supply.

16. The switching power supply of claim 14, further comprising an absorption circuit, wherein the absorption circuit comprises a fifth resistor and a first capacitor connected in series with each other.

17. The switching power supply of claim 13, further comprising a second voltage divider circuit, wherein the second voltage divider circuit comprises a third resistor and a fourth resistor; and the second voltage divider circuit is configured to generate a second voltage divider signal so that the secondary control module acquires an output voltage of the switching power supply.

18. The switching power supply of claim 17, further comprising an absorption circuit, wherein the absorption circuit comprises a fifth resistor and a first capacitor connected in series with each other.

19. The switching power supply of claim 13, further comprising an absorption circuit, wherein the absorption circuit comprises a fifth resistor and a first capacitor connected in series with each other.

20. A switching power supply control method, wherein a switching power supply comprises a primary side winding, a secondary side winding, a primary side control module, a secondary side control module, a first switching transistor connected to the first winding, a second switching transistor connected to the secondary side winding, and an optocoupler;

wherein the switching power supply control method comprises:

after high-voltage startup of the switching power supply, adjusting, by the secondary side control module, a cut-off current of the second switching transistor according to a voltage waveform at a fourth connection point between the secondary side winding and the second switching transistor until a voltage waveform at a third connection point between the primary side winding and the first switching transistor just reaches zero;

in response to that the voltage waveform at the third connection point just reaches zero, controlling, by the primary side control module, the first switching transistor to be turned on to achieve zero-voltage turn-on of a primary side;

after the zero-voltage turn-on of the primary side, adjusting, by the primary side control module, a peak current of the first switching transistor until the peak current of the first switching transistor reaches a preset value;

in response to that the peak current of the first switching transistor reaches the preset value, controlling, by the primary side control module, the first switching transistor to be turned off;

after the first switching transistor is turned off, controlling, by the secondary side control module, the second switching transistor to be turned on;

in response to a switching current of the second switching transistor being at a current zero-crossing point, controlling, by the secondary side control module, the second witching transistor to be turned off; and in response to that an output load of the switching power supply changes and the switching current of the second switching transistor is greater than a second preset value, controlling, by the primary side control module, a switching current of the first switching transistor according to a feedback signal from the optocoupler to adjust an output voltage of the switching power supply.

* * * * *